Patented June 2, 1936

2,042,657

UNITED STATES PATENT OFFICE 2,042,657

PREPARATION OF SOLUBLE PARAFORMALDEHYDE

Wilbie S. Hinegardner, Niagara Falls, N. Y., assignor to E. I. du Pont de Nemours & Company, Inc., Wilmington, Del., a corporation of Delaware No Drawing. Application April 27, 1934, Serial No. 722,813

11 Claims. (Cl. 252—2)

This invention relates to the production of paraformaldehyde, and more particularly to a method of preparing paraformaldehyde having a high degree of solubility in water.

Paraformaldehyde is a polymerized product of formaldehyde, each molecular unit of which consists of one molecule of water combined with a plurality of molecules of formaldehyde. The probable type formula of paraformaldehyde is as follows:

$HOCH_2(OCH_2)nOCH_2OH$

Paraformaldehyde is not to be confused with trioxymethylene $(CH_2O)_3$ or the polyoxymethylenes which are relatively much less soluble, although the term "paraformaldehyde" is sometimes mistakenly applied to trioxymethylene and the polyoxymethylenes. Paraformaldehyde is a white solid which on standing slowly evolves vapors of formaldehyde. It dissolves to a limited extent in water to produce a solution of formaldehyde. It is used in disinfecting and fumigating operations and in other arts as a source of formaldehyde.

Paraformaldehyde has heretofore been prepared by evaporating aqueous formaldehyde solutions, preferably by vacuum distillation. Low temperature vacuum distillation produces a relatively soluble paraformaldehyde but requires so long an evaporation time as to be commercially impracticable.

When paraformaldehyde is used to prepare aqueous solutions of formaldehyde, a product of high solubility is of course desirable. However, heretofore the preparation of aqueous solutions of formaldehyde from paraformaldehyde has been of limited application because of the relative insolubility of the paraformaldehyde.

An object of this invention is to produce an improved composition containing polymerized formaldehyde and having a high degree of solubility in water. Other objects will be hereinafter apparent.

These objects are accomplished by mixing an aqueous formaldehyde solution with a silicate solution under such conditions that gelation occurs. A substantially homogeneous composition comprising paraformaldehyde and silica gel is obtained.

I have discovered that when an aqueous formaldehyde solution is contacted with an aqueous solution of an alkali metal silicate, a silica gel is formed and concurrently the bulk of the formaldehyde is polymerized. Apparently the two solutions act upon each other, that is, the formaldehyde causes the formation of silica gel, while the silicate or some constituent thereof, possibly alkali metal hydroxide, aided by withdrawal of water to form the gel, causes the polymerization of the formaldehyde. When the resulting gel composition is carefully dehydrated, preferably at a temperature sufficiently low to avoid undue volatilization of formaldehyde, a substantially homogeneous, solid composition is obtained which is characterized by having a much higher degree of solubility in water and greater volatility and chemical reactivity than ordinary paraformaldehyde.

As indicated at the beginning of this specification, there are two types of formaldehyde polymers, (a) paraformaldehydes and (b) polyoxymethylenes. My novel product may be explained as being chiefly a low molecular weight paraformaldehyde combined in some fashion with silica gel. The paraformaldehyde may be partly chemically combined with the silica, partly adsorbed on the silica surface and partly a mechanical mixture of the two constituents, or solely a homogeneous mechanical mixture. In the following description and in accordance with this explanation, I shall refer to my product as a composition containing paraformaldehyde and silica gel. However, I do not wish to be restricted to this explanation, since it is conceivable that the product may contain formaldehyde polymer other than paraformaldehyde.

In one method of practicing my invention a solution of an alkali metal silicate is rapidly stirred with a formaldehyde solution in such proportions that the formaldehyde concentration will be sufficient to cause the formation of a silica gel and simultaneously polymerize a substantial portion of the formaldehyde. The formation of a silica gel from the silicate solution under these conditions is probably due to the slight acidity of the formaldehyde solution. In some cases, for example, where the silicate solution is of high alkalinity, I prefer to accelerate the formation of the silica gel by the addition of another acidic substance. In this case it is preferable to add the acid to the formaldehyde solution prior to mixing it with the silicate solution. Various kinds and proportions of acidic substances which may be used in accordance with my invention may be varied within wide limits, in accordance with the procedure already established in the art of producing silica gel by the addition of acids to silicate solutions. As is well known, various acidic substances may be used to produce silica gel, for example, hydrochloric, sulphuric or phosphoric acids, or various organic acids such as acetic acid, citric acid or tartaric acid. In general if the concentration of formaldehyde in the mixture of formaldehyde and silicate solutions is below 10 to 15% by weight, it usually will be necessary to add an acid to cause gel formation. The formaldehyde concentration, below which the addition of acid is required, will, however, vary somewhat with the alkalinity of the silicate. Strongly oxidizing acids, e. g., nitric acid, are preferably not used, since these will oxidize the formaldehyde.

The amount of acid added will determine the time in which gel formation occurs. Within certain limits, as the concentration of the acid is increased the time of gel formation is likewise increased, until at certain concentrations of acid the solution will stand for an indefinite time without substantial gel formation. However, if the acidity is further increased a point is reached in the case of any particular acid where an increase of acid concentration will progressively decrease the time required for gel formation. Since formaldehyde itself is acidic in nature, the relative concentration of the silicate and the formaldehyde will affect the time required for gelation, in accordance with the above statements. Further, gel formation usually may be accelerated by warming the solution, e. g. to 50 to 100° C. These known facts concerning the use of acids and heat in the formation of silica gels are applicable to the practice of my invention by using acids and/or heating in conjunction with the addition of formaldehyde solution.

By varying the amount of acid used in producing the silica gel-paraformaldehyde composition, the alkalinity of the product may be correspondingly regulated. For example, if a product is made by reacting formaldehyde solution with an alkali metal silicate in the absence of an acid, the product obtained upon solution in water will give an alkaline solution, the degree of alkalinity depending upon the amount of alkali metal oxide contained in the silicate solution used. On the other hand, if sufficient of a strong acid is used in conjunction with the formaldehyde solution, a product may be obtained which dissolves in water to produce a substantially neutral solution of formaldehyde.

The amount of formaldehyde solution to be added to the silicate solution may be varied widely in producing my novel composition. However, I have found that in most cases the concentration of formaldehyde in the mixture at the time of gelation should be not less than about 10% by weight; this limiting concentration will vary somewhat, depending upon the composition of the silicate used. At lower concentrations of formaldehyde, little or no formaldehyde polymerization occurs at the time of gelation. On drying, part of the formaldehyde is evaporated; hence if the initial concentration of formaldehyde is much less than 10%, the final dried product will contain too little formaldehyde to be of practical value. In order to obtain a reasonably rapid rate of formaldehyde polymerization I prefer to use such amounts of formaldehyde that the formaldehyde concentration at the time of gelation is not less than about 20% by weight.

After the silica gel formaldehyde polymer composition has been formed in accordance with my invention, the gel may be dried to produce a soft, friable, homogeneous composition, characterized by having a high rate of solubility in water. The dehydration may be accomplished by drying in air or in vacuum, by well-known methods. It is preferable that the drying temperature should not exceed about 70° C., since I have found that at higher temperatures there is a tendency for the formation of less soluble formaldehyde polymers.

My invention may be further illustrated by the following examples:

*Example I*

To 800 grams of a formaldehyde solution containing 44.2% by weight of formaldehyde, 5 c.c. of concentrated HCl and then 47.5 grams of a sodium silicate solution having a specific gravity of 1.3 having the approximate formula of $Na_2O.3.97SiO_2$ and diluted with 37.5 grams of water, was added with rapid stirring at about 25° C. In about two minutes a translucent gel was formed. After the gel had stood for about one hour it became opaque due to polymer formation. The opaque gel was found to contain 39.6% by weight of formaldehyde. The gel was dried at room temperature; the dried product contained 87.7% by weight of formaldehyde and weighed 276.8 grams.

*Example II*

One hundred grams of a 41.3% formaldehyde solution was heated to 70–75° C. and 26 grams of a silicate solution having a specific gravity of 1.3 was rapidly stirred into the hot formaldehyde solution. No acid or excess water was added. In this case, gel formation did not commence until about eight minutes after mixing. After standing about 24 hours, the translucent gel became opaque and was then found to contain about 38% of formaldehyde. The opaque gel was evaporated to dryness in the air, whereupon a white solid was obtained which contained 87.8% by weight of formaldehyde.

*Example III*

The process of Example I was repeated, except that the acid was omitted. The resulting dried product weighed 285.9 grams and contained 86.5% by weight of formaldehyde equivalent.

*Example IV*

A number of samples of paraformaldehyde silica gel compositions were prepared by the methods illustrated by the above Examples I, II, and III and the rate of solubilities of these products were compared with the rate of solubilities of samples of ordinary paraformaldehyde which had been made by evaporation of formaldehyde solutions. In each case, the approximate solubility rate was determined by suspending a 5-gram sample in 25 cc. of water at room temperature and thoroughly agitating by means of a shaking machine for one hour. The liquid was then filtered, the residue was washed with exactly 10 cc. of water and the washings and filtrate were diluted to a volume of exactly 100 cc. A 25 cc. portion of the solution thus obtained was analyzed by treating with an excess of sodium sulfite and titrating the sodium hydroxide produced by the sulfite reaction by means of a standard acid. The approximate solubility rate of each sample was determined by the same method and under identical conditions. The results obtained are given in the following tables:

A. *Paraformaldehyde-silica gel compositions made from formaldehyde and sodium silicate solutions, with and without addition of acid (HCl)*

| Sample | Formaldehyde content (percent by weight) | Solution rate percent $CH_2O$ dissolved in one hour |
|---|---|---|
| 1. Made with addition of HCl | 86.19 | 88.4 |
| 2. Made with addition of HCl | 81.93 | 100.0 |
| 3. Made with addition of HCl | 87.72 | 92.4 |
| 4. Made with addition of HCl | 88.38 | 99.4 |
| 5. Made without addition of acid | 86.49 | 100.0 |

B. *paraformaldehyde made by evaporation of formaldehyde solution in absence of silicate*

| Sample | Formaldehyde content (percent by weight) | Solution rate percent $CH_2O$ dissolved in one hour |
|---|---|---|
| 1 | 95.73 | 2.3 |
| 2 | 95.49 | 2.0 |

*Example V*

The volatility of a number of samples of paraformaldehyde-silicate gel compositions made by the methods illustrated by Examples I, II, and III was compared with the volatility of a sample of commercial paraformaldehyde made by the evaporation of formaldehyde solutions. In each case, the volatility was determined by weighing out samples each of which contained exactly one gram of formaldehyde equivalent, spreading the weighed samples in thin layers in shallow containers open to the air and weighing each sample from time to time to determine the amount of formaldehyde given off. The entire series was tested at the same time; hence, each sample was tested under identical conditions. The resultant data are tabulated below. The loss in weight in some examples exceeded one gram, because the small amount of water present evaporated with the formaldehyde, these samples initially contained around 5% by weight of water.

*Weight loss of paraformaldehyde samples*

| Time | Silica gel-paraformaldehyde made without acid | Silica gel-paraformaldehyde made with acid HCl | Paraformaldehyde made by evap'n of $CH_2O$ solution |
|---|---|---|---|
| | *Grams* | *Grams* | *Grams* |
| 1 day | 0.2109 | 0.1686 | 0.0382 |
| 2 days | 0.5471 | 0.4624 | 0.1341 |
| 5 days | 1.0064 | 0.9209 | 0.4213 |
| 9 days | 1.0471 | 1.0434 | 0.6773 |

Various modifications of my invention may be made without departing from the spirit and scope thereof and will be apparent to those skilled in the art of preparing formaldehyde polymers and/or silica gels.

The silica gel—formaldehyde polymer compositions which may be made according to my invention may contain from about 40 to 95% of formaldehyde, which may be partially or wholly in the form of paraformaldehyde.

As shown by the above examples, I have obtained by my invention silica gel-formaldehyde polymer compositions containing up to around 90% of formaldehyde equivalent, which products are much more soluble and more volatile, i. e. produce formaldehyde vapors much more easily than varieties of paraformaldehyde known heretofore.

I have further found that my novel composition is more reactive chemically than ordinary paraformaldehyde. For example, I have found that when a quantity of my product is added to animal glue, the glue is set on about two hours standing, whereas an equivalent amount of ordinary paraformaldehyde added to the same grade of glue does not effect a setting until after five or six hours.

I claim:

1. A process for making a formaldehyde polymer composition comprising mixing a folmaldehyde solution with a solution of a soluble silicate to form a substantially homogeneous composition of silica gel and formaldehyde polymer.

2. A process for making a formaldehyde polymer composition comprising mixing a formaldehyde solution with a solution of an alkali metal silicate to form a substantially homogeneous composition of silica gel and formaldehyde polymer.

3. A process for making a formaldehyde polymer comprising mixing a formaldehyde solution with a solution of a soluble silicate in such manner that the formaldehyde concentration in the resulting mixture will be not less than about 10% by weight to form a substantially homogeneous composition of silica gel and formaldehyde polymer.

4. A process for making a formaldehyde polymer composition comprising mixing a formaldehyde solution with a solution of an alkali metal silicate in such manner that the formaldehyde concentration in the resulting mixture will be not less than about 10% by weight to form a substantially homogeneous composition of silica gel and formaldehyde polymer and dehydrating said composition.

5. A process for making a formaldehyde polymer composition comprising mixing a formaldehyde solution with a solution of sodium silicate in such manner that the formaldehyde concentration in the resulting mixture will be not less than about 20% by weight to form a substantially homogeneous composition of silica gel and formaldehyde polymer and dehydrating said composition at a temperature not higher than about 70° C.

6. A process for making a formaldehyde polymer composition comprising mixing a formaldehyde solution with a solution of sodium silicate in the presence of an acid in such manner that the formaldehyde concentration in the resulting mixture will be not less than about 20% by weight to form a substantially homogeneous composition of silica gel and formaldehyde polymer and dehydrating said composition at a temperature not higher than about 70° C.

7. A process for making a formaldehyde polymer composition comprising mixing a formaldehyde solution with a solution of an alkali metal silicate in such manner that the formaldehyde concentration in the resulting mixture will be not less than about 20% by weight at a temperature of 15 to 80° C. to form a substantially homogeneous composition of silica gel and formaldehyde polymer and dehydrating said composition.

8. A substantially homogeneous composition comprising silica gel and formaldehyde polymer.

9. A substantially homogeneous solid composition comprising formaldehyde polymer and silica gel and containing the equivalent of 40% to 90% by weight of formaldehyde.

10. A substantially homogeneous solid composition comprising formaldehyde polymer and 5 to 10% by weight of silica gel and containing the equivalent of 40% to 90% by weight of formaldehyde.

11. A substantially homogeneous solid composition comprising formaldehyde polymer and at least partially dehydrated silica gel and containing the equivalent of 40% to 90% by weight of formaldehyde.

WILBIE S. HINEGARDNER.